US011592900B1

(12) United States Patent
Meyer (10) Patent No.: US 11,592,900 B1
(45) Date of Patent: Feb. 28, 2023

(54) METHOD AND DEVICE FOR OPERATING A LASER UNIT AS A FUNCTION OF A DETECTED STATE OF AN OBJECT, AND LASER DEVICE

(71) Applicant: Robert Bosch GmbH, Stuttgart (DE)

(72) Inventor: Johannes Meyer, Haseluenne (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/875,896

(22) Filed: Jul. 28, 2022

(30) Foreign Application Priority Data

Aug. 5, 2021 (DE) ................. 10 2021 208 483.4

(51) Int. Cl.
*G06F 3/01* (2006.01)
*G01C 3/08* (2006.01)
*G06F 3/03* (2006.01)

(52) U.S. Cl.
CPC .............. *G06F 3/013* (2013.01); *G01C 3/08* (2013.01); *G06F 3/0304* (2013.01)

(58) Field of Classification Search
CPC .......... G06F 3/013; G06F 3/0304; G01C 3/08
See application file for complete search history.

(56) References Cited

U.S. PATENT DOCUMENTS

| 10,012,734 | B2* | 7/2018 | Sebastian | G01S 17/58 |
|---|---|---|---|---|
| 2008/0192229 | A1* | 8/2008 | Bruekers | G01P 13/02 |
| | | | | 356/28 |
| 2017/0184721 | A1* | 6/2017 | Sun | G01S 7/51 |
| 2018/0232575 | A1* | 8/2018 | Strombom | A61B 3/113 |
| 2019/0176341 | A1* | 6/2019 | Mei | B25J 9/1697 |

FOREIGN PATENT DOCUMENTS

DE 102020206821 A1 12/2021

OTHER PUBLICATIONS

Meyer, et al.: "A CNN-based Human Activity Recognition System Combining a Laser Feedback Interferometry Eye Movement Sensor and an IMU for Context-aware Smart Glasses," Proc. ACM Interact. Mob. Wearable Ubiquitous Techno!. 5 (4), Article 172 (2021), O01:https://doi.org/10.1145/3494998, pp. 1-24.

Meyer, et al.: "A compact low-power gaze gesture sensor based on laser feedback interferometry for smart glasses," Proc. SPIE 11788, Digital Optical Technologies 2021 , 117880D (Jun. 20, 2021 ); https://doi.org/10.1117/12.2593772, pp. 1-14.

Meyer, et al.: "A Novel Gaze Gesture Sensor for Smart Glasses Based on Laser Self-Mixing," Extended Abstracts of the 2021 CHI Conference on Human Factors in Computing Systems, Assoc. for Computing Machinery, New York, NY, USA, Article 254, (2021), pp. 1-6, https://doi.org/10.1145/3411763.3451621.

\* cited by examiner

*Primary Examiner* — Jonathan A Boyd
(74) *Attorney, Agent, or Firm* — Norton Rose Fulbright US LLP; Gerard Messina (57) ABSTRACT

A method for operating a laser unit as a function of a detected state of an object. The method includes: outputting a light beam having a light beam intensity, using the laser unit, during a first time period and a second time period; receiving at least one reflected partial beam having a partial beam intensity during the first and second time periods; making the light beam and the partial beam interfere with each other in the first and second time periods to obtain a first interference parameter for the first time period and a second interference parameter for the second time period; ascertaining the state of the object; changing an operating state of the laser unit as a function of the ascertained state of the object.

12 Claims, 6 Drawing Sheets

METHOD AND DEVICE FOR OPERATING A LASER UNIT AS A FUNCTION OF A DETECTED STATE OF AN OBJECT, AND LASER DEVICE

CROSS REFERENCE

The present application claims the benefit under 35 U.S.C. § 119 of German Patent Application No. DE 10 2021 208 483.4 filed on Aug. 5, 2021, which is expressly incorporated herein by reference in its entirety.

FIELD

The present invention is directed to a method and a device for operating a laser unit as a function of a detected state of an object, as well as to a laser device. A computer program is also the subject matter of the present invention.

BACKGROUND INFORMATION

In connection with a technological transformation in everyday life and with regard to data goggles, so-called eye tracking sensor systems are becoming increasingly more important. Sensor devices of this type may also be used, for example, in the automobile industry in connection with a velocity measurement, distance measurement, vibration measurement, flow measurement and, additionally or alternatively to particle counting or measurement.

In addition to a Fourier transform method usable for this purpose, a further method is available, for example, which makes it possible to ascertain a velocity from the time signals via the "fringe counting" method.

SUMMARY

The present invention provides an improved method for operating a laser unit as a function of a detected state of an object, and an improved laser device, also a device which uses this method, and finally a corresponding computer program. The measures disclosed herein make advantageous refinements of and improvements to the device according to the present invention.

Due to the present invention, a possibility may be advantageously provided for prolonging an operating time, for example of data goggles, by recognizing an eye movement and, for example, by activating an energy saving mode.

In accordance with an example embodiment of the present invention, a method is provided for operating a laser unit as a function of a detected state of an object, the method including an output step, a receiving step, an interference step, an ascertainment step and a changing step. In the output step, a light beam is output onto the object during a first time period and a second time period, using the laser unit, the light beam having a light beam intensity. In the receiving step, at least one partial beam of the light beam reflected at the object is received during the first time period and the second time period, the partial beam having a partial beam intensity. In the interference step, the light beam and the partial beam are made to interfere with each other in the first time period to obtain a first interference parameter for the first time period, and the light beam and the partial beam are made to interfere with each other in the second time period to obtain a second interference parameter for the second time period. In the ascertainment step, the state of the object is ascertained, using the first interference parameter and the second interference parameter, an idle state of the object being ascertained if the first interference parameter and the second interference parameter are the same within a tolerance range, and additionally or alternatively a motion state of the object being ascertained in the first time period or in the second time period if the first interference parameter and the second interference parameter differ from each other by more than the tolerance range. In a change step, an operating state of the laser unit is furthermore changed as a function of the ascertained state of the object, in particular, the laser unit being placed into an energy saving mode if the idle state of the object was ascertained.

The laser unit may be designed, for example, as a laser light source, which is designed to output a laser beam. For example, the laser unit may be implemented as part of a laser device, for example, in connection with a set of data goggles. The object may correspondingly be, for example, an eye of a user. The light beam may be output, for example, as a modulated light beam. The reflected partial beam may also be referred to, for example, as a reflection beam, which has a different intensity than the light beam. The interference parameters may include, for example, at least one beam property of the light beam and additionally or alternatively of the partial beam. The state of the object may be, for example, a state in which the object moves or turns. The idle state of the object may represent, for example, an eye of the user directed to a point or, for example a closed eye thereof. In the motion state, the eye may, for example, be active.

According to one specific example embodiment of the present invention, in the interference step, a value may be obtained as the first interference parameter, which represents a number of maxima within the first time period or a time interval between two adjacent maxima within the first time period. The second interference parameter may furthermore be obtained, which represents a number of maxima within the second time period or a time interval between two of the maxima within the second time period. The maxima may be implemented, for example, as power maxima. A fast and precise detection of a state of an object may be advantageously made possible hereby.

According to one specific example embodiment of the present invention, in the ascertainment step, the idle state and additionally or alternatively the motion state may be ascertained, using the tolerance range, which is no more than 20%, in particular, no more than 10%. An operating time of eye tracking sensor systems may be advantageously improved thereby.

The interference step may furthermore be carried out to obtain the first interference parameter and additionally or alternatively the second interference parameter, and additionally or alternatively the ascertainment step may be carried out to ascertain the idle state and additionally or alternatively the motion state, using a Fourier transform. A determination of the state of the object may be advantageously carried out, by means of which a heat development of the laser unit may be reduced and thus the lifespan of the laser device prolonged. In the case of a high integration of the laser device, an energy saving mode may be advantageously implemented as the operating mode.

In the output step, the light beam may also be output having a different light intensity in at least one part of the first time period than in the second time period. For example, a precision of the ascertainment of the state of the object may be advantageously improved thereby.

According to one specific example embodiment of the present invention, in the output step, the light beam may be output having a rising, in particular linearly rising, light intensity in the first time period. Additionally or alternatively, the light beam may be output having a falling, in particular linearly falling, light intensity in the second time period. The rising and additionally or alternatively the falling light intensity may be advantageously represented or implemented as ramps. The ramps may advantageously have the same slope if the light beam has the same light intensity, for example, in both time periods.

In the output step, a light source of the laser device may be controlled in such a way that the light intensity at the end of the first time period may correspond to the light intensity at the beginning of the second time period. In this way, an abrupt change in the operating parameters of the laser device may be minimized or avoided, which contributes to a lower load on the laser device.

According to one specific example embodiment of the present invention, the first time period and the second time period used in the output step, in the receiving step and in the interference step may be disjointed with respect to each other and/or not overlap each other. In other words, this means that the first time period and the second time period, for example, do not overlap. Unique and quickly ascertainable interference parameters may be obtained hereby for the first and second time periods.

Moreover, the first time period and the second time period used in the output step, in the receiving step and in the interference step may have the same length. The time periods may advantageously be of equal length, so that the values or parameters occurring during the time periods may be processed using processing specifications of the same design and thus standardized, for example by counting or, for example, by detecting the intervals between the maxima.

According to one specific example embodiment of the present invention, a spatial distance of the laser unit to the object may be ascertained in the ascertainment step, using the first and additionally or alternatively the second interference parameter. A velocity may advantageously be additionally or alternatively ascertained. A conclusion as to the viewing direction of one eye may be advantageously ascertained, or whether the data goggles rest, for example, on the nose of the user, ready for operation.

This method may be implemented, for example, in software or hardware or in a mixed form of software and hardware, for example in a control unit.

The present invention further provides a device which is designed to carry out, control or implement the steps of one variant of a method presented here in corresponding equipment. This embodiment variant of the present invention in the form of a device also makes it possible to achieve the object underlying the approach quickly and efficiently.

For this purpose, the device may include at least one processing unit for processing signals or data, at least one memory unit for storing signals or data, at least one interface to a sensor or an actuator for reading in sensor signals from the sensor or for outputting data or control signals to the actuator, and/or at least one communication interface for reading in or outputting data, which are embedded in a communication protocol. The processing unit may be, for example a signal processor, a microcontroller or the like, while the memory unit may be a flash memory, an EEPROM or a magnetic memory unit. The communication interface may be designed to read in or output data wirelessly and/or in a hard-wired manner, a communication interface which may read in or output hard-wired data being able to read in these data, for example electrically or optically, from a corresponding data transfer line or output them into a corresponding data transfer line.

In the present case, a device may be understood to be an electrical device which processes sensor signals and outputs control and/or data signals as a function thereof. The device may include an interface which may be designed as hardware and/or software. In the case of a hardware design, the interfaces may be, for example, part of a so-called system ASIC, which contains a wide range of functions of the device. It is, however, also possible that the interfaces are independent, integrated circuits or are at least partially made up of discrete components. In the case of a software design, the interfaces may be software modules, which are present, for example, on a microcontroller alongside other software modules.

According to an example embodiment of the present invention, a computer program product or computer program, including program code, is also advantageous, which may be stored on a machine-readable carrier or memory medium, such as a semiconductor memory, a hard disk memory, or an optical memory, and is used for carrying out, implementing and/or activating the steps of the method according to one of the specific embodiments described above, in particular when the program product or program is executed on a computer or a device.

A laser device is also provided according to an example embodiment of the present invention, which includes a laser unit for outputting a light beam onto the object during a first time period and a second time period, the light beam having a light beam intensity. The laser device also includes a receiving unit for receiving at least one partial beam of the light beam reflected at the object during the first time period and the second time period, the partial beam having a partial beam intensity, as well as a device in an aforementioned variant.

The laser device may be designed, for example, as part of a set of data goggles or, for example, be referred to as data goggles. The laser unit may include, for example, the light source as well as, for example, a modulation unit. The receiving unit may receive, for example, the reflected partial beam and, for example, additionally or alternatively convert the pieces of information contained therein in such a way that the device may process this very information as a control unit.

Exemplary embodiments of the present invention are illustrated in the figures and explained in greater detail in the description below.

DETAILED DESCRIPTION OF EXAMPLE EMBODIMENTS

In the following description of favorable exemplary embodiments of the present approach, identical or similar reference numerals are used for the elements which are illustrated in the various figures and have the same or similar functions, a description of these elements not being provided repeatedly.

Figure 1:
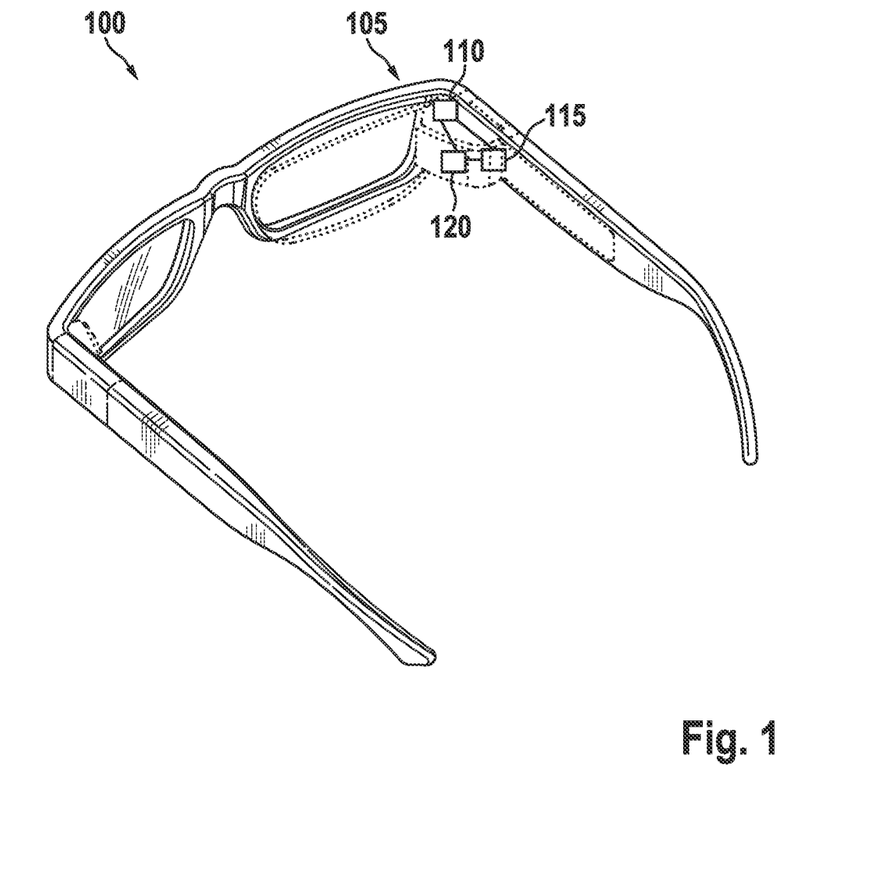
FIG. 1 shows a schematic representation of a set of data goggles, including a laser device, according to one exemplary embodiment of the present invention.

FIG. 1 shows a schematic representation of a set of data goggles 100, including a laser device 105, according to one exemplary embodiment. Data goggles 100 illustrated in FIG. 1 are designed only as an example. Laser device 105 includes a laser unit 110 for outputting a light beam onto an object during a first time period and a second time period, the light beam having a light beam intensity. Laser device 105 furthermore includes a receiving unit 115 for receiving at least one partial beam of the light beam reflected at the object during the first time period and the second time period, the partial beam having a partial beam intensity. Laser device 105 also includes a device 120, which is designed to control or carry out a method for detecting a state of the object, using laser unit 110, as explained in one of the following figures. Device 120 is designed, for example, to obtain a first interference parameter for the first time period in the case of an interference of the light beam and the partial light beam in the first time period and the second time period, and to obtain a second interference parameter for the second time period, and to ascertain a state of the object, using the first interference parameter and the second interference parameter.

Figure 2:
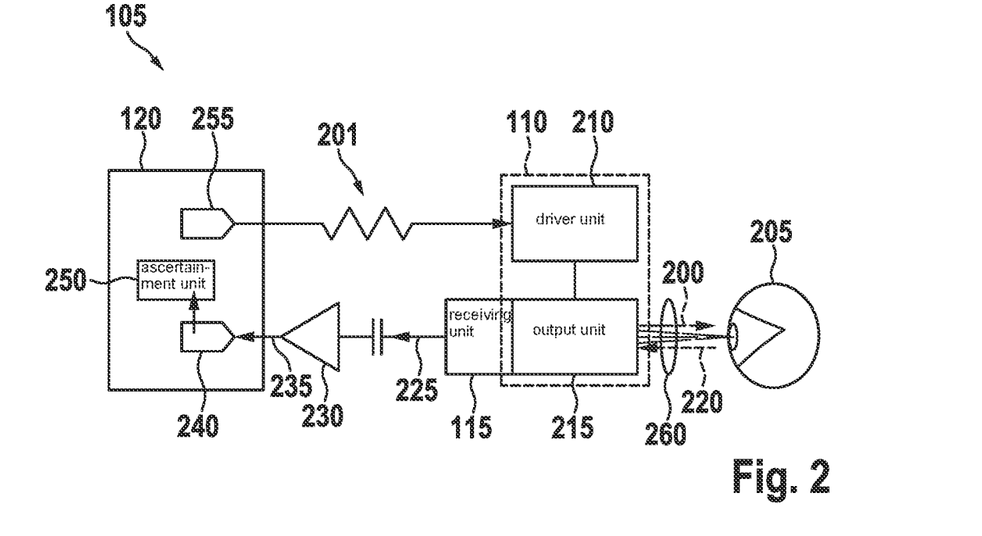
FIG. 2 shows a schematic representation of one exemplary embodiment of the laser device of the present invention.

FIG. 2 shows a schematic representation of one exemplary embodiment of a laser device 105. Laser device 105 illustrated in FIG. 2 corresponds to or resembles at least laser device 105 described in FIG. 1. Laser device 105 according to this exemplary embodiment may be used, for example, for a set of data goggles, as was described, for example, in FIG. 1. According to this exemplary embodiment, light beam 200, for example a laser beam modulated with the aid of a triangular modulation 201, is output using laser unit 110 in the direction of object 205, which represents, for example, a human eye. According to this exemplary embodiment, laser unit 110 includes a driver unit 210 and an output unit 215 for this purpose. Driver unit 210 is designed to electrically control output unit 215 and thus to prompt the output of light beam 200. A partial beam 220 of light beam 200 reflected by object 205 is received, using receiving unit 115 implemented according to this exemplary embodiment as a photodiode, and, for example, a modulated optical power or partial beam intensity of partial beam 220 is detected. Receiving unit 115 is only optionally integrated or integratable into laser unit 110. An amplifier element 230, which is designed, for example, as a transimpedance amplifier, is controlled by receiving unit 115, for example using a photodiode signal 225 representing the partial beam intensity. Amplifier element 230 is designed, for example, to convert photodiode signal 225 into a voltage signal 235.

Device 120 is designed to detect and/or evaluate an interference of light beam 200 and partial light beam 220 in the first time period and the second time period, for example using voltage signal 235, in that it determines a first interference parameter for the first time period and a second interference parameter for the second time period. According to this exemplary embodiment, device 120 includes a converter 240, which is designed to convert voltage signal 235 into a digital signal 245 and, using the latter, for example in an ascertainment unit 250 of device 120, to ascertain a state of an object 205, using the first interference parameter and the second interference parameter. An idle state of object 205 is ascertained if the first interference parameter and the second interference parameter are the same within a tolerance range. A motion state of object 205 in the first time period or in the second time period is ascertained if the first interference parameter and the second interference parameter differ from each other by more than the tolerance range. Device 120 only optionally includes a further converter 255, which is designed to convert a digital signal into an analog signal.

In other words, a reduction of the power consumption of a signal processing unit, for example an ASIC, is presented by the approach described here for processing laser feedback interferometry sensor data. An underlying measuring method is based on the interference of light beam 200 with itself, which is reflected back by object 205 as a partial beam 220 and is injected back into the laser cavity of laser unit 110, which is also referred to as self-mixing interference.

The laser, i.e., output unit 215, is supplied with current and excited by driver element 210, which is also referred to as a laser driver, so that it begins to emit laser light in the form of light beam 200. The latter is focused onto an object 205, which is also referred to as the target and which is measured, for example via a lens 260.

According to this exemplary embodiment, receiving unit 115 is integrated into output unit 215, which detects the modulated optical power. Photodiode signal 225 is subsequently interactively (AC) or as an alternating signal coupled or converted and converted via transimpedance amplifier (TIA) 230 into voltage signal 235, which is converted into a digital signal by an analog/digital converter (ADC) 240. A triangular signal 265, with the aid of which the current at output unit 215 is modulated via driver unit 210, is generated by the digital logic, which according to this exemplary embodiment is described as device 120. A minimal heating and cooling of a semiconductor material of laser unit 110 results therefrom, which leads to a periodic change in length of a laser cavity. The change in length of the cavity results in a periodic modulation of the wavelength of laser unit 110 and thus the frequency. To calculate a distance and velocity, corresponding photodiode signal 225 is sampled in device 120 for a triangle, which is made up of a rising and a falling ramp, and divided into an area t_up and an area t_down, based on the triangular ramps. These subareas are subsequently converted into the frequency range with the aid of a Fourier transform (FFT), and signal maxima f_up and f_down are determined in the frequency range. The distance as well as a sign-bearing velocity may be subsequently ascertained from these signal maxima, which are also referred to as peaks. The entire signal processing requires high signal samplings to avoid so-called aliasing effects, as well as a continuous calculation of spectra with the aid of FFTs. This results in a high continuous power consumption of the so-called application-specific integrated circuit (ASIC), which leads to a reduction in the operating time of the sensor system with limited available energy as well as to a high heat development. The heat development results in a reduction of the lifespan of laser device 105, in particular, in the case of a high integration of sensor components and ASIC. The human eye, however, is stationary most of the time and fixes an object. A continuous measurement of eye speed and distance to the eye is therefore not absolutely necessary for different eye tracking methods. This results in that a large proportion of redundant information is detected during a continuous measurement.

Figure 3:
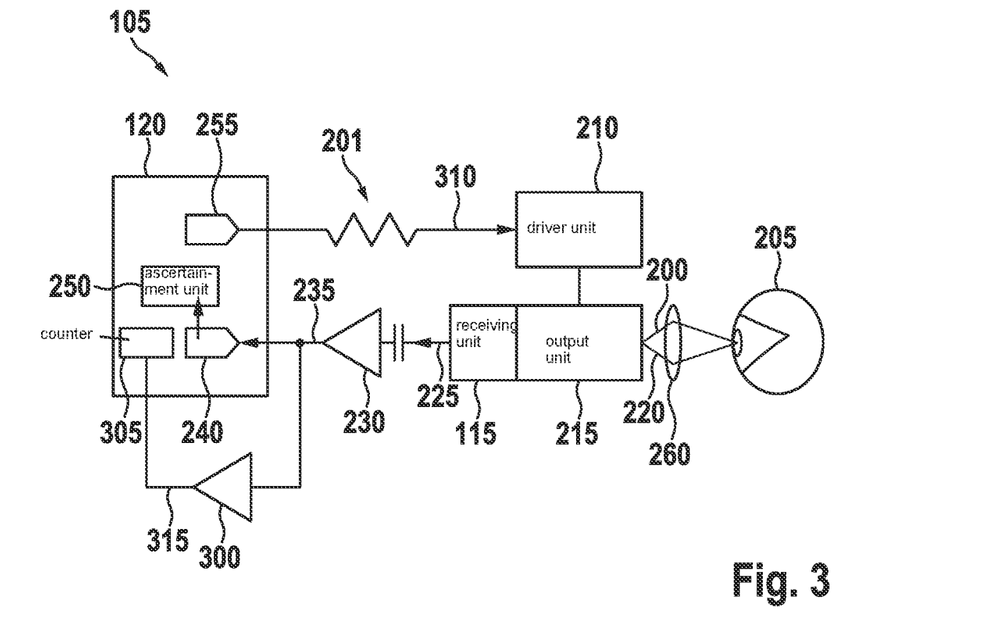
FIG. 3 shows a schematic representation of one exemplary embodiment of the laser device of the present invention.

FIG. 3 shows a schematic representation of one exemplary embodiment of a laser device 105. Laser device 105 illustrated here corresponds to or resembles at least laser device 105 described in FIG. 2. According to this exemplary embodiment, laser device 105 only additionally includes at least one switching element 300, which is also referred to, for example, as a comparator, and a counter 305. According to this exemplary embodiment, the switching element is connected to amplifier element 230 and counter 305. Counter 305 is designed as part of device 120.

According to this exemplary embodiment, in other words, a hierarchical measuring method is described, which uses a "fringe counting method." This means that, according to this exemplary embodiment, a modified system diagram is described. Device 120 generates, for example, a modulation signal 310, which in this example represents triangular modulation 201. Driver element 210, which modulates output unit 215, is controlled with the aid of this modulation signal 310, which is also referred to as a triangular signal. Laser unit 110 irradiates object 205, light beam 200 being focused on object 205, for example by a lens 260. A corresponding interference signal, which was also described as photodiode signal 225, is interactively coupled and amplified via amplifier element 230 and converted into voltage signal 235. The detection of the signal subsequently takes place with the aid of converter 240 (ADC) in device 120. An analog signal is furthermore output in parallel to analog switching element 300, which converts signal fringes into a pulse signal 315. The fringes are converted into pulses, for example via a comparator, thresholds of the comparator being fixedly set via resistors or configured by the ASIC. Alternatively, zero crossings of the fringe signal are counted. Moreover, a raw signal is optionally also obtained from the voltage at the laser diode instead of an integrated photodiode 115.

Figure 4:
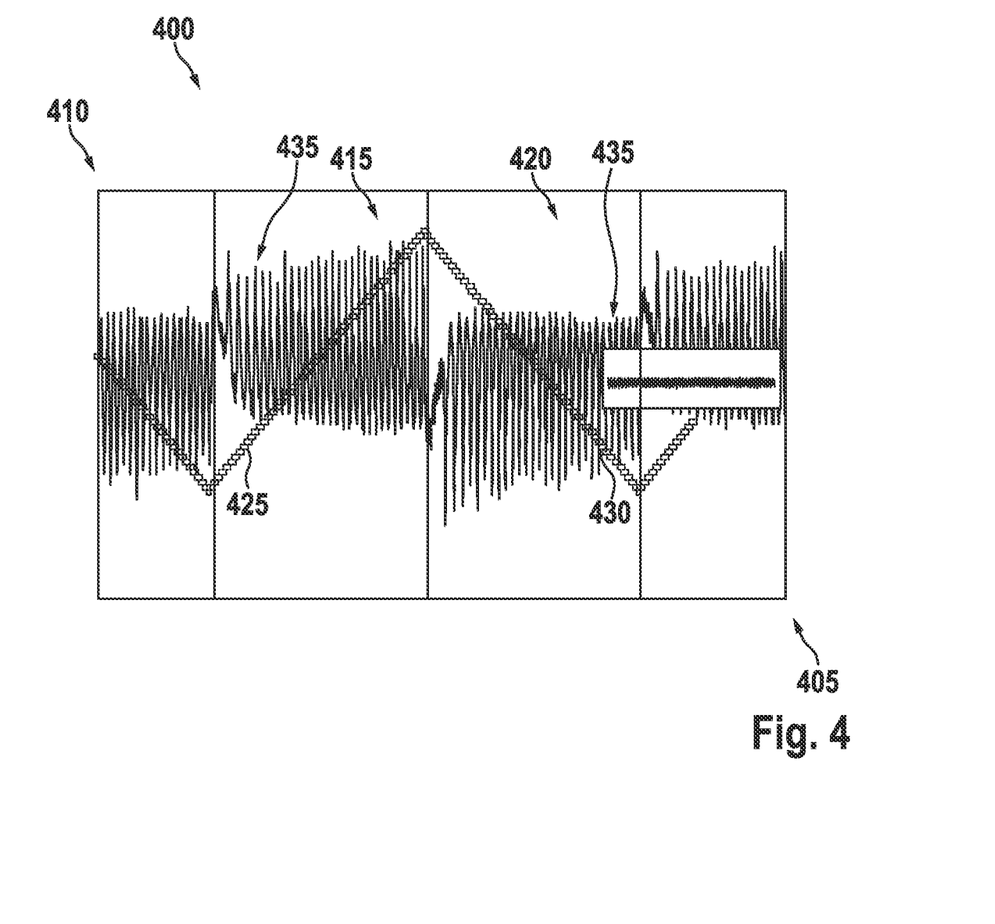
FIG. 4 shows a diagram representation of an interference pattern of a light beam and a partial beam for explaining one exemplary embodiment of the procedure presented here for a stationary object, according to the present invention.

FIG. 4 shows a diagram representation of an interference pattern 400 of a light beam and a partial beam for explaining one exemplary embodiment of the procedure presented here for a stationary object. X axis 405 is designed as the time axis, and the y axis represents, for example, an intensity of the light beam and the partial beam. Interference pattern 400 is depicted as a fringe signal according to this exemplary embodiment. According to this exemplary embodiment, first time period 615 [sic; 415] and second time period 620 [sic; 420], which each include a ramp, are illustrated in the diagram. According to this exemplary embodiment, the ramps are alternatingly illustrated, so that first time period 615 [sic; 415] represents a rising ramp 625 [sic; 425], and second time period 620 [sic; 420] represents a falling ramp 630 [sic; 430]. According to this exemplary embodiment, interference pattern 400 has the same number of maxima 435, in particular power maxima, in first time period 415 as in second time period 420. For example, 28 maxima 435, which are also referred to as peaks, are apparent in each case in rising and falling ramps 425, 430. Therefore, n_up=n_down=28 is the same for a stationary target.

Figure 5:
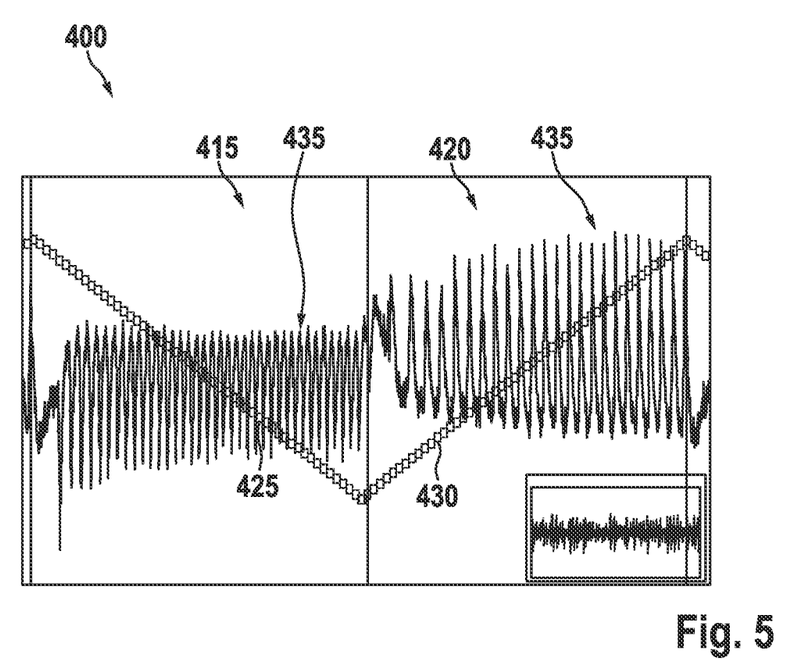
FIG. 5 shows a diagram representation of an interference pattern of a light beam and a partial beam for explaining one exemplary embodiment of the procedure presented here for a moving object, according to the present invention.

FIG. 5 shows a diagram representation of an interference pattern 400 of a light beam and a partial beam for explaining one exemplary embodiment of the procedure presented here for a moving object. Interference pattern 400 illustrated in FIG. 5 resembles interference pattern 400 described in FIG. 4. According to this exemplary embodiment, the only deviation is the number of maxima 435, so that first time period 415 has more maxima 435 than second time period 420. In other words, n_up and n_down are different in rising and falling ramps 425, 430.

In other words, a simple counter is used for the method for detecting a state of an object using a laser unit, which counts the pulses of a preprocessed analog signal in each case for rising and falling ramps 425, 430. If the eye is stationary, the number of maxima 435, which are also referred to as fringes n_up and n_down, is the same, and the integrated converter is switched off for the detailed detection of the raw signal as well as the signal processing block including the FFT, which results in a significant reduction of the power consumption. Only if a difference between n_up and n_down is established does the eye begin to move, and a new detection of the raw signal as well as a processing thereof is necessary. It is furthermore possible to define a threshold value of the difference between n_up and n_down, starting at which a significant movement of the eye is recognized. This significant movement may be reported to a central unit, for example the device, for example using a "significant motion" interrupt, so that, for example, a set of data goggles reacts to the eye activity, and velocities as well as distances may be called up.

Figure 6:
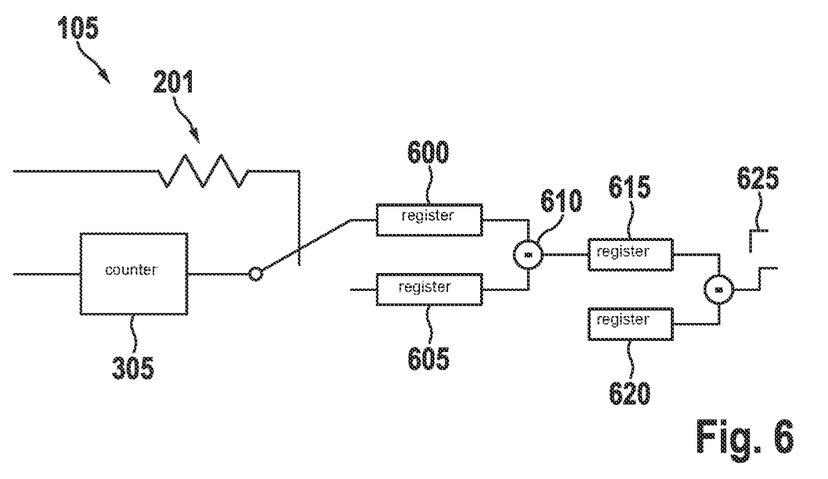
FIG. 6 shows a schematic representation of one exemplary embodiment of a laser device, according to the present invention.

FIG. 6 shows a schematic representation of one exemplary embodiment of a laser device. Laser device 105 illustrated here resembles, for example, laser device 105 described in one of FIGS. 1 through 3. The exemplary embodiment illustrated in FIG. 6 is represented as an alternative implementation form of the device for generating interrupts. This means that a possibility is shown for switching over between an active mode of the laser device and an energy saving mode of the laser device. The pulses are counted by a counter 304, and the counter content is written in each case to a register 600 for n_up and a further register 605 for n_down as a function of an instantaneous modulation ramp. The switching over between registers 600, 605 takes place, for example, via the triangular signal, which is provided in a digital circuit with the aid of a triangular modulation 201. The triangular signal may also be integrated and used, for example in the form of a rectangular signal, as a switch for activating a simple multiplexer. After each complete ramp up and ramp down, a difference 610 of n_up and n_down is formed and stored as an absolute value in a third register 615. The comparison of the difference with a configurable threshold then takes place, which is stored in a fourth register 620. If the threshold is exceeded, an interrupt signal 625 is set, which is used internally by the device to connect a signal processing and the signal pickup. By evaluating the sign of the difference of n_up and n_down, the sign and thus the direction of the velocity may also be discriminated and output via a further interrupt. This makes it possible to also very energy-efficiently ascertain the direction of the velocity.

Figure 7:
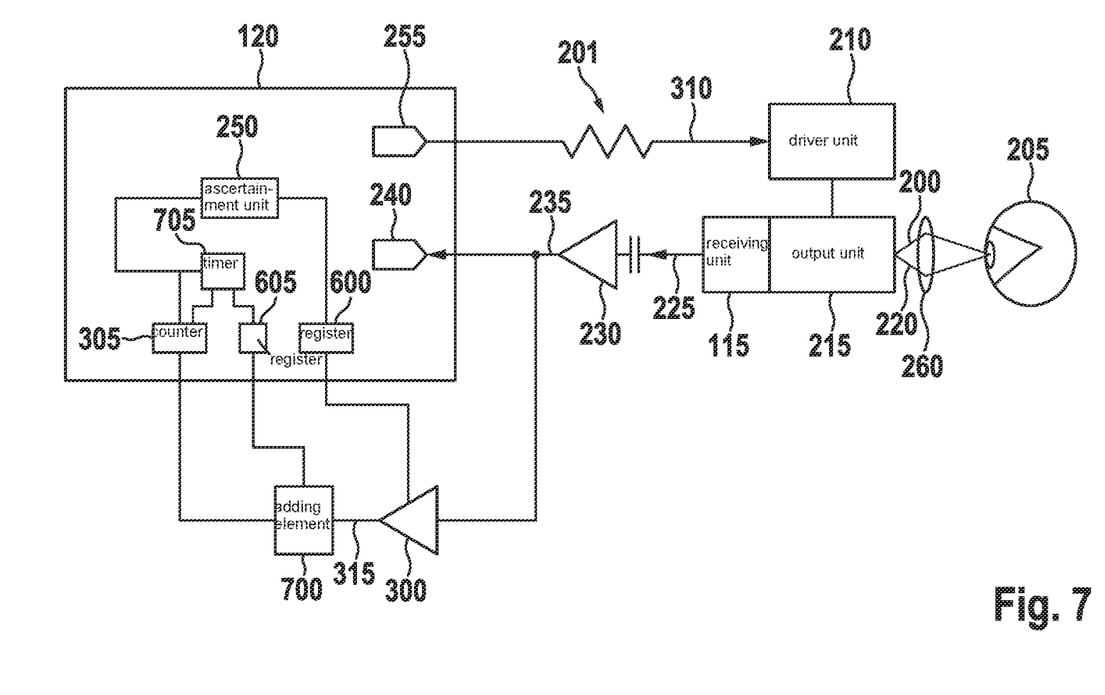
FIG. 7 shows a schematic representation of one exemplary embodiment of a laser device, according to the present invention.

FIG. 7 shows a schematic representation of one exemplary embodiment of a laser device 105. Laser device 105 illustrated here resembles, for example, laser device 105 described in FIG. 3. According to this exemplary embodiment, laser device 105 additionally includes an adding element 700, which is connected to switching element 300 and counter 305. According to this exemplary embodiment, device 120 furthermore includes a timer 705 including a reset logic, which is designed to reset counter 305 and/or adding element 700, using a predefined threshold value, upon reaching the threshold value. Device 120 also includes a register 600 and a further register 605, as was described, for example, in FIG. 6. Register 600 is situated between ascertainment unit 250 and switching element 300. Further register 605 according to this exemplary embodiment is connected between timer 705 and adding element 700.

In other words, according to this exemplary embodiment, the modulation of the laser is dispensed with during a low-power operating mode, i.e., during an energy saving mode, which results in a reduction of the power consumption, since device 120 is also switched off for triangle generation during the energy saving mode. In this mode, the laser unit is operated in CW mode and is only able to measure velocities.

The output of transimpedance amplifier 230 is furthermore guided to switching element 300 referred to as the comparator or Schmitt trigger, which according to this exemplary embodiment has an adjustable threshold value, so that ascertainment unit 250 adjusts the thresholds, for example via a controller 600, in such a way that the fringes are correctly detected. A calibration routine may be used for setting controller 600, in which a stationary target (velocity=0) or object 205 having a known velocity is used. The number of fringes is subsequently counted, for example by adding element 700. A wake-up circuit compares the counter content with a predefined threshold and wakes up device 120 or components thereof. Since counter 305 reaches the threshold for waking up the electronics at some point even during very slow movements, which may possibly be below the significant desired movement, the electronics may be cyclically set to a defined starting value via a timer 705 including the reset logic. To set the sensitivity, the threshold is now adapted in the wake-up logic, timer 705 is used, which predefines the interval at which adding element 700 is reset, and the reset logic including a prescaler is also used, i.e., the reset takes place only if the time interval has been reached multiple times.

Figure 8:
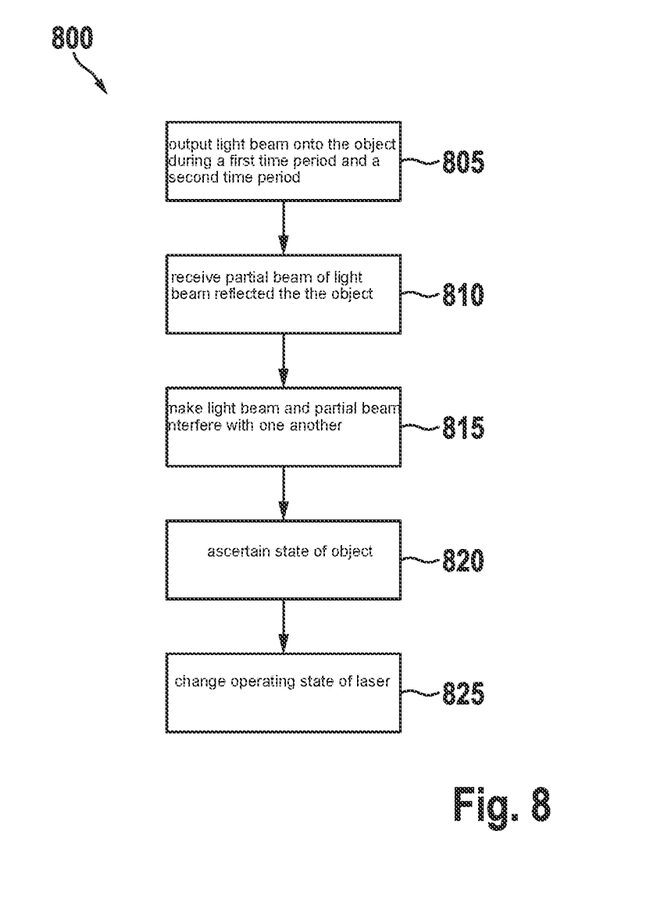
FIG. 8 shows a flowchart of a method according to one exemplary embodiment for operating a laser unit as a function of a detected state of an object, according to the present invention.

FIG. 8 shows a flowchart of a method 800 according to one exemplary embodiment for operating a laser unit as a function of a detected state of an object. Method 800 may be carried out within a laser device, as was described, for example, in at least one of FIGS. 1, 2, 3, 6, 7. For this purpose, method 800 includes a step 805 of outputting a light beam onto the object during a first time period and a second time period, using the laser unit, the light beam having a light beam intensity. A light beam modulated with the aid of a triangular modulation is only optionally output. Method 800 further includes a step 810 of receiving at least one partial beam of the light beam reflected at the object during the first time period and the second time period, the partial beam having a partial beam intensity, and a step 815 of making the light beam and the partial beam interfere with each other in the first time period to obtain a first interference parameter for the first time period, and making the light beam and the partial beam interfere with each other in the second time period to obtain a second interference parameter for the second time period. In an ascertainment step 820, the state of the object is ascertained, using the first interference parameter and the second interference parameter, an idle state of the object being ascertained if the first interference parameter and the second interference parameter are the same within a tolerance range, and/or a motion state of the object being ascertained in the first time period or in the second time period if the first interference parameter and the second interference parameter differ from each other by more than the tolerance range of, for example, no more than 20%, in particular, no more than 10%. In a change step 825, an operating state of the laser unit is changed as a function of the ascertained state of the object, in particular, the laser unit being placed in an energy saving mode if the idle state of the object was ascertained.

The first time period and the second time period used in the output step, in receiving step 810 and in interference step 815 only optionally have an identical length, so that potential differences within the individual time periods are detectable, and, for example, conclusions as to the state of the object are possible. In output step 805, the light beam is also optionally output including a different light intensity in at least one part of the first time period than in the second time period. More specifically, the light beam is output in the first time period having a rising, in particular, linearly rising, light intensity, and/or in the second time period having a falling, in particular, linearly falling, light intensity.

According to this exemplary embodiment, the laser device is controlled in output step 805 in such a way that the light intensity at the end of the first time period corresponds to the light intensity at the beginning of the second time period. As a result, the time periods, for example, follow each other or do not overlap. The interference parameters obtained in interference step 815 represent at least one value, which represents a number of maxima, which are also referred to as peaks, in particular, power maxima, or, for example, a time distance between two adjacent peaks. Method 800 or at least interference step 810 and/or ascertainment step 815 are carried out, for example, with the aid of a Fourier transform. According to this exemplary embodiment, a spatial distance and only optionally a velocity to the object are furthermore ascertained in ascertainment step 820, using the first and/or the second interference parameter(s).

The method steps presented here may be repeated and executed in an order different from the one described.

If an exemplary embodiment includes an "and/or" linkage between a first feature and a second feature, this is to be read in such a way that the exemplary embodiment has both the first feature and the second feature according to one specific embodiment and either only the first feature or only the second feature according to a further specific embodiment.

What is claimed is:

1. A method for operating a laser unit as a function of a detected state of an object, the method comprising the following steps:
   outputting a light beam onto the object, using the laser unit, during a first time period and a second time period;
   receiving at least one partial beam of the light beam reflected at the object during the first time period and the second time period, the partial beam having a partial beam intensity;
   in an interference step, making the light beam and the partial beam interfere with each other in the first time period to obtain a first interference parameter for the first time period, and making the light beam and the partial beam interfere with each other in the second time period to obtain a second interference parameter for the second time period;
   ascertaining the state of the object, using the first interference parameter and the second interference parameter, an idle state of the object being ascertained when the first interference parameter and the second interference parameter are the same within a tolerance range, and/or a motion state of the object being ascertained in the first time period or in the second time period when the first interference parameter and the second interference parameter differ from each other by more than the tolerance range; and changing an operating state of the laser unit as a function of the ascertained state of the object, the laser unit being placed into an energy saving mode when the idle state of the object is ascertained.

2. The method as recited in claim 1, wherein a value is obtained in the interference step as the first interference parameter, which represents a number of maxima within the first time period or a time distance between two adjacent maxima within the first time period, and the second interference parameter being obtained, which represents a number of maxima within the second time period or a distance between two of the maxima within the second time period.

3. The method as recited in claim 2, wherein the interference step and/or the ascertainment step, is carried out using an energy-efficient analog circuit for counting the maxima as the first and second interference parameters of the first and second time periods.

4. The method as recited in claim 1, wherein, in the output step, the light beam is output having a different light intensity in at least one part of the first time period than in the second time period.

5. The method as recited in claim 4, wherein, in the output step, the light beam is output in the first time period having a linearly rising light intensity, and/or the light beam is output in the second time period having a linearly falling light intensity.

6. The method as recited in claim 4, wherein, in the output step, the laser unit is controlled in such a way that a light intensity at the end of the first time period corresponds to a light intensity at the beginning of the second time period.

7. The method as recited in claim 1, wherein the first time period and the second time period used in the output step, in the receiving step, and in the interference step, are disjointed with respect to each other and/or do not overlap with each other.

8. The method as recited in claim 1, wherein first time period and the second time period used in the output step, in the receiving step, in the interference step have the same length.

9. The method as recited in claim 1, wherein a spatial distance of the laser unit to the object is ascertained in the ascertainment step, using the first interference parameter and/or the second interference parameter.

10. A device configured to operate a laser unit as a function of a detected state of an object, the device configured to:

output a light beam onto the object, using the laser unit, during a first time period and a second time period;

receive at least one partial beam of the light beam reflected at the object during the first time period and the second time period, the partial beam having a partial beam intensity;

make the light beam and the partial beam interfere with each other in the first time period to obtain a first interference parameter for the first time period, and make the light beam and the partial beam interfere with each other in the second time period to obtain a second interference parameter for the second time period;

ascertain the state of the object, using the first interference parameter and the second interference parameter, an idle state of the object being ascertained when the first interference parameter and the second interference parameter are the same within a tolerance range, and/or a motion state of the object being ascertained in the first time period or in the second time period when the first interference parameter and the second interference parameter differ from each other by more than the tolerance range; and change an operating state of the laser unit as a function of the ascertained state of the object, the laser unit being placed into an energy saving mode when the idle state of the object is ascertained.

11. A non-transitory machine-readable memory medium on which is stored a computer program for operating a laser unit as a function of a detected state of an object, the computer program, when executed by a computer, causing the computer to perform the following steps:

outputting a light beam onto the object, using the laser unit, during a first time period and a second time period;

receiving at least one partial beam of the light beam reflected at the object during the first time period and the second time period, the partial beam having a partial beam intensity;

in an interference step, making the light beam and the partial beam interfere with each other in the first time period to obtain a first interference parameter for the first time period, and making the light beam and the partial beam interfere with each other in the second time period to obtain a second interference parameter for the second time period;

ascertaining the state of the object, using the first interference parameter and the second interference parameter, an idle state of the object being ascertained when the first interference parameter and the second interference parameter are the same within a tolerance range, and/or a motion state of the object being ascertained in the first time period or in the second time period when the first interference parameter and the second interference parameter differ from each other by more than the tolerance range; and changing an operating state of the laser unit as a function of the ascertained state of the object, the laser unit being placed into an energy saving mode when the idle state of the object is ascertained.

12. A laser device, comprising:

a laser unit configured to output a light beam onto an object during a first time period and a second time period;

a receiving unit configured to receive at least one partial beam of the light beam reflected at the object during a first time period and during a second time period, the partial beam having a partial beam intensity; and a device configured to operate the laser unit as a function of a detected state of the object, the device configured to:

output the light beam onto the object, using the laser unit, during the first time period and the second time period;

receive, using the receiving unit, at least one partial beam of the light beam reflected at the object during the first time period and the second time period, the partial beam having a partial beam intensity;

make the light beam and the partial beam interfere with each other in the first time period to obtain a first interference parameter for the first time period, and make the light beam and the partial beam interfere with each other in the second time period to obtain a second interference parameter for the second time period;

ascertain the state of the object, using the first interference parameter and the second interference parameter, an idle state of the object being ascertained when the first interference parameter and the second interference parameter are the same within a tolerance range, and/or a motion state of the object being ascertained in the first time period or in the second time period when the first interference parameter and the second interference parameter differ from each other by more than the tolerance range; and change an operating state of the laser unit as a function of the ascertained state of the object, the laser unit being placed into an energy saving mode when the idle state of the object is ascertained.

\* \* \* \* \*